US010862643B2

United States Patent
Doll et al.

(10) Patent No.: US 10,862,643 B2
(45) Date of Patent: Dec. 8, 2020

(54) DEVICE AND USER EQUIPMENT TO PROCESS A CHANNEL STATE INFORMATION REFERENCE SIGNAL

(71) Applicant: Alcatel Lucent, Nozay (FR)

(72) Inventors: Mark Doll, Stuttgart (DE); Stephan Saur, Stuttgart (DE); Frank Schaich, Stuttgart (DE); Thorsten Wild, Stuttgart (DE)

(73) Assignee: Alcatel Lucent, Nozay (FR)

( * ) Notice: Subject to any disclaimer, the term of this patent is extended or adjusted under 35 U.S.C. 154(b) by 12 days.

(21) Appl. No.: 16/321,264

(22) PCT Filed: Jul. 27, 2017

(86) PCT No.: PCT/EP2017/068968
§ 371 (c)(1),
(2) Date: Jan. 28, 2019

(87) PCT Pub. No.: WO2018/028998
PCT Pub. Date: Feb. 15, 2018

(65) Prior Publication Data
US 2019/0182004 A1     Jun. 13, 2019

(30) Foreign Application Priority Data
Aug. 10, 2016   (EP) ..................... 16290149

(51) Int. Cl.
*H04L 5/00*      (2006.01)
*H04L 27/26*     (2006.01)

(52) U.S. Cl.
CPC .......... *H04L 5/0048* (2013.01); *H04L 5/0057* (2013.01); *H04L 27/2602* (2013.01); *H04L 27/2613* (2013.01)

(58) Field of Classification Search
None
See application file for complete search history.

(56) References Cited

U.S. PATENT DOCUMENTS

| 2007/0189240 | A1* | 8/2007 | Cho | ...................... | H04L 5/0051 |
| | | | | | 370/337 |
| 2007/0211790 | A1* | 9/2007 | Agrawal | ................ | H04B 1/713 |
| | | | | | 375/147 |

(Continued)

OTHER PUBLICATIONS

Nokia et al: "Flexible numerology for 5G", vol. RAN WG1, No. Nanjing; May 23, 2016-May 27, 2016, May 13, 2016 (May 13, 2016), XP051096688, Retrieved from the Internet <URL:http://www.3gpp.org/ftp/tsg_ran/WG1_RL1/TSGR1_85/Docs/> [retrieved on May 13, 2016].

(Continued)

*Primary Examiner* — Chi H Pham
*Assistant Examiner* — Vladislav Y Agureyev
(74) *Attorney, Agent, or Firm* — Harness, Dickey & Pierce, P.L.C.

(57) ABSTRACT

A device to process a channel state information reference signal CSI-RS and further data to be transmitted via a first radio module of a radio communications network, in which data to be transmitted is mapped on subcarriers and in the radio module subsequently up-converted to a radio frequency higher than the subcarrier frequencies is provided. The subcarriers are grouped into frequency subbands, and at least one subband is scalable with at least one subband parameter for a period of time. A subband parameter is in particular a subcarrier spacing, and in at least one subband at least two different parameters, in particular subcarrier spacings, can be used.

13 Claims, 6 Drawing Sheets

(56) References Cited

U.S. PATENT DOCUMENTS

| | | | | |
|---|---|---|---|---|
| 2008/0051095 | A1* | 2/2008 | Chang | H04B 1/109 455/446 |
| 2009/0185632 | A1* | 7/2009 | Cai | H04L 5/0044 375/260 |
| 2009/0299788 | A1* | 12/2009 | Huber | G06Q 20/387 455/456.3 |
| 2011/0135016 | A1* | 6/2011 | Ahn | H04L 5/0037 375/259 |
| 2011/0149929 | A1* | 6/2011 | Kleider | H04L 5/0023 370/338 |
| 2012/0177139 | A1* | 7/2012 | Anto | H04L 1/0606 375/267 |
| 2014/0219152 | A1* | 8/2014 | Anto | H04W 52/08 370/311 |
| 2015/0049836 | A1* | 2/2015 | Li | H04L 5/0048 375/295 |
| 2015/0055525 | A1* | 2/2015 | Ma | H04W 24/02 370/281 |
| 2015/0146641 | A1* | 5/2015 | Kim | H04L 5/0048 370/329 |
| 2015/0351098 | A1* | 12/2015 | Schellmann | H04L 5/0064 370/329 |
| 2015/0372843 | A1* | 12/2015 | Bala | H04L 25/03834 375/295 |
| 2015/0381331 | A1* | 12/2015 | Kim | H04L 5/0048 370/329 |
| 2016/0044681 | A1* | 2/2016 | Zhou | H04L 5/0051 370/329 |
| 2016/0088500 | A1* | 3/2016 | Chen | H04B 7/0626 370/280 |
| 2017/0048033 | A1* | 2/2017 | Porat | H04L 5/0023 |
| 2017/0317796 | A1* | 11/2017 | Lan | H04L 5/0007 |
| 2018/0097676 | A1* | 4/2018 | Kazmi | H04L 27/2647 |
| 2018/0279289 | A1* | 9/2018 | Islam | H04L 5/0094 |
| 2019/0097859 | A1* | 3/2019 | Bala | H04L 25/0224 |
| 2019/0166503 | A1* | 5/2019 | Ahn | H04B 7/0617 |

OTHER PUBLICATIONS

Samsung: "CSI reporting for NR", vol. RAN WG1, No. Nanjing, China; May 23, 2016-May 27, 2016, May 13, 2016 (May 13, 2016), XP051090297, Retrieved from the Internet <URL:http://www.3gpp.org/ftp/tsg_ran/WG1_RL1/TSGR1_85/Docs/> [retrieved on May 13, 2016].

Samsung: "Discussions on CSI-RS design for NR", vol. RAN WG1, No. Nanjing, China; May 23, 2016-May 27, 2016, May 13, 2016 (May 13, 2016), XP051090298, Retrieved from the Internet <URL:http://www.3gpp.org/ftp/tsg_ran/WG1_RL1/TSGR1_85/Docs/> [retrieved on May 13, 2016].

International Search Report PCT/ISA/210 for International Application No. PCT/EP2017/068968 dated Sep. 28, 2017.

Written Opinion of the International Searching Authority PCT/ISA/237 for International Application No. PCT/EP2017/068968 dated Sep. 28, 2017.

* cited by examiner

DEVICE AND USER EQUIPMENT TO PROCESS A CHANNEL STATE INFORMATION REFERENCE SIGNAL

CROSS-REFERENCE TO RELATED APPLICATIONS

This application is a national phase under 35 U.S.C. § 371 of PCT International Application No. PCT/EP2017/068968 which has an International filing date of Jul. 27, 2017, which claims priority to European Application No. 16290149.0, filed Aug. 10, 2016, the entire contents of each of which are hereby incorporated by reference.

FIELD OF THE INVENTION

The present invention relates to a device to process a channel state information reference signal and to a user equipment to process a channel state information reference signal.

BACKGROUND

Evolving radio communications standards like 5G permit an efficient multi-cell/multi-TP (transmission point) support of mixed numerologies, namely mixed carrier configurations, supporting signal processing both for data and pilot symbols thus including channel estimation.

5G in general and specifically 3GPP New Radio targets multi-service support within one carrier. As the different service use cases are very different from each other, they motivate different multi-carrier waveform parameters each.

SUMMARY

In view of this, it is an object of the present invention to provide an improved device to process a channel state information reference signal.

It is proposed a device to process a channel state information reference signal CSI-RS and further data to be transmitted via a first radio module of a radio communications network, in which data to be transmitted is mapped on subcarriers and in the radio module subsequently up-converted to a radio frequency higher than the subcarrier frequencies, wherein the subcarriers are grouped into frequency subbands, and wherein at least one subband is scalable with at least one subband parameter for a period of time, wherein a subband parameter is in particular a subcarrier spacing, and wherein in at least one subband at least two different parameters, in particular subcarrier spacings, can be used, wherein the device comprises at least a processor and a memory, and is configured to:
  determine a first CSI-RS and a second CSI-RS,
  determine first further data and second further data;
  allocate for a first period of time the first CSI-RS to a first subband and the second CSI-RS to a second subband of a time-frequency resource,
  allocate for a second period of time subsequent to and different from the first period of time the first further data to the first subband and the second further data to the second subband, and
  map the first CSI-RS, the second CSI-RS, the first further data and the second further data to subcarriers corresponding to the allocated subbands.

A period of time can correspond to e.g. a TTI, a multiple of a TTI, a subframe, a multiple of a subframe, or a frame.

The sum of the first and the second period of time can correspond to e.g. a multiple of a TTI, a subframe, a multiple of a subframe, or a frame.

The device allows a reduction of inter-carrier interference as an aligned carrier configuration in form of the subband parameter is used for the modulation and transmission of CSI-RS. This enables an efficient orthogonal or near-orthogonal sequence set across multiple devices. All pilots received by a user equipment originating from a plurality of devices can be treated as CSI-RS and not as noise. As a result the proposed teaching in this description allows an integration of mixed carrier configurations supporting efficiently a multi-transmission point system setup. For example, low latency services (e.g. ultra-reliable low latency, URLLC) and high velocity use cases demand short symbol durations and thus large subcarrier spacings, while e.g. use cases like multi-cast/broadcast (MBMS) demand long symbol durations and thus small subcarrier spacings. According to an advantageous embodiment the subband parameter is stored on the memory as at least one preconfigured value. A simple and cost effective implementation of the aligned carrier configuration is established as no backhaul network is needed. However, a combination of preconfigured and coordinated aligned carrier configuration is also feasible.

According to an advantageous embodiment the subband parameter is reveived from a further device via a backhaul network.

According to an advantageous embodiment the subband parameter is determined, and wherein the subband parameter is transmitted to a further device. Therefore, a safe coordination of the subband parameter is established.

According to an advantageous embodiment the first and second time-frequency resources are separated in time. By separating in time guard bands are avoided.

According to an advantageous embodiment the first and second time-frequency resources are separated in frequency. This allows transmitting further data by means of the first and second time-frequency resources.

According to an advantageous embodiment a guard-band is located between the first and second time-frequency resources. The guard-band protects the CSI-RS from side lobes and other signals.

According to an advantageous embodiment the device is configured to: —allocate a first one of first time-frequency resources with a first subband parameter, —allocate a second one of first time-frequency resources with a second subband parameter differing from the first subband parameter; and the radio module being configured to: —transmit a first CSI-RS via the first one of first time-frequency resources, and—transmit a second CSI-RS via the second one of first time-frequency resources. By providing first and second subband parameters special use cases or special devices can be differentiated with respect to the CSI-RS transmission.

According to an advantageous embodiment the device is configured to: —receive a service request from a user equipment, and determine the further carrier configuration of the second time-frequency resource in dependence on the service request. By taking into account the service request special use cases or special devices can be differentiated with respect to the further data transmission.

According to an embodiment the device is configured to: —receive a first sounding symbol, a second sounding symbol, a third further data and a fourth further data via subcarriers corresponding to allocated subbands, wherein for a third period of time subsequent to and different from a fourth period of time the third further data is allocated to the third subband and the fourth further data to the fourth subband, wherein for the third period of time the first sounding symbol is allocated to the third subband and the second sounding symbol is allocated to the third subband of a time-frequency resource, —determine the first sounding symbol and the second sounding symbol, —determine the third further data and the third further data According to a further aspect a user equipment to process a channel state information reference signal CSI-RS and further data to be received via a second radio module of a radio communications network is proposed. In the radio communications network data to be transmitted is mapped on subcarriers and in the radio module subsequently up-converted to a radio frequency higher than the subcarrier frequencies, wherein the subcarriers are grouped into frequency subbands, and wherein at least one subband is scalable with at least one subband parameter for a period of time, wherein a subband parameter is in particular a subcarrier spacing, and wherein in at least one subband at least two different parameters, in particular subcarrier spacings, can be used, wherein the user equipment comprises at least a processor and a memory, and is configured to: —receive a first CSI-RS, a second CSI-RS, a first further data and a second further data via subcarriers corresponding to allocated subbands, wherein for a second period of time subsequent to and different from a first period of time the first further data is allocated to the first subband and the second further data to the second subband, wherein for the first period of time the first CSI-RS is allocated to the first subband and the second CSI-RS is allocated to the second subband of a time-frequency resource, —determine the first CSI-RS and the second CSI-RS), —determine the first further data and the second further data.

According to an embodiment the user equipment is configured to process a sounding symbol and further data to be transmitted via a second radio module of the radio communications network, in which data to be transmitted is mapped on subcarriers and in the second radio module subsequently up-converted to a radio frequency higher than the subcarrier frequencies, wherein the subcarriers are grouped into frequency subbands, and wherein at least one subband is scalable with at least one subband parameter for a period of time, wherein a subband parameter is in particular a subcarrier spacing, and wherein in at least one subband at least two different parameters, in particular subcarrier spacings, can be used, wherein the user equipment comprises at least a processor and a memory, and is configured to: —determine a first sounding symbol and a second sounding symbol, —determine third further data and third further data; —allocate for a third period of time the first sounding symbol to a third subband and the second sounding symbol to a fourth subband of a time-frequency resource, —allocate for a fourth period of time subsequent to and different from the third period of time the third further data to the third subband and the fourth further data to the fourth subband, and —map the first sounding symbol, the second sounding symbol, the third further data and the fourth further data to subcarriers corresponding to the allocated subbands. According to a further aspect a radio communications network comprises: the device and the user equipment.

DESCRIPTION OF THE EMBODIMENTS

Figure 1:
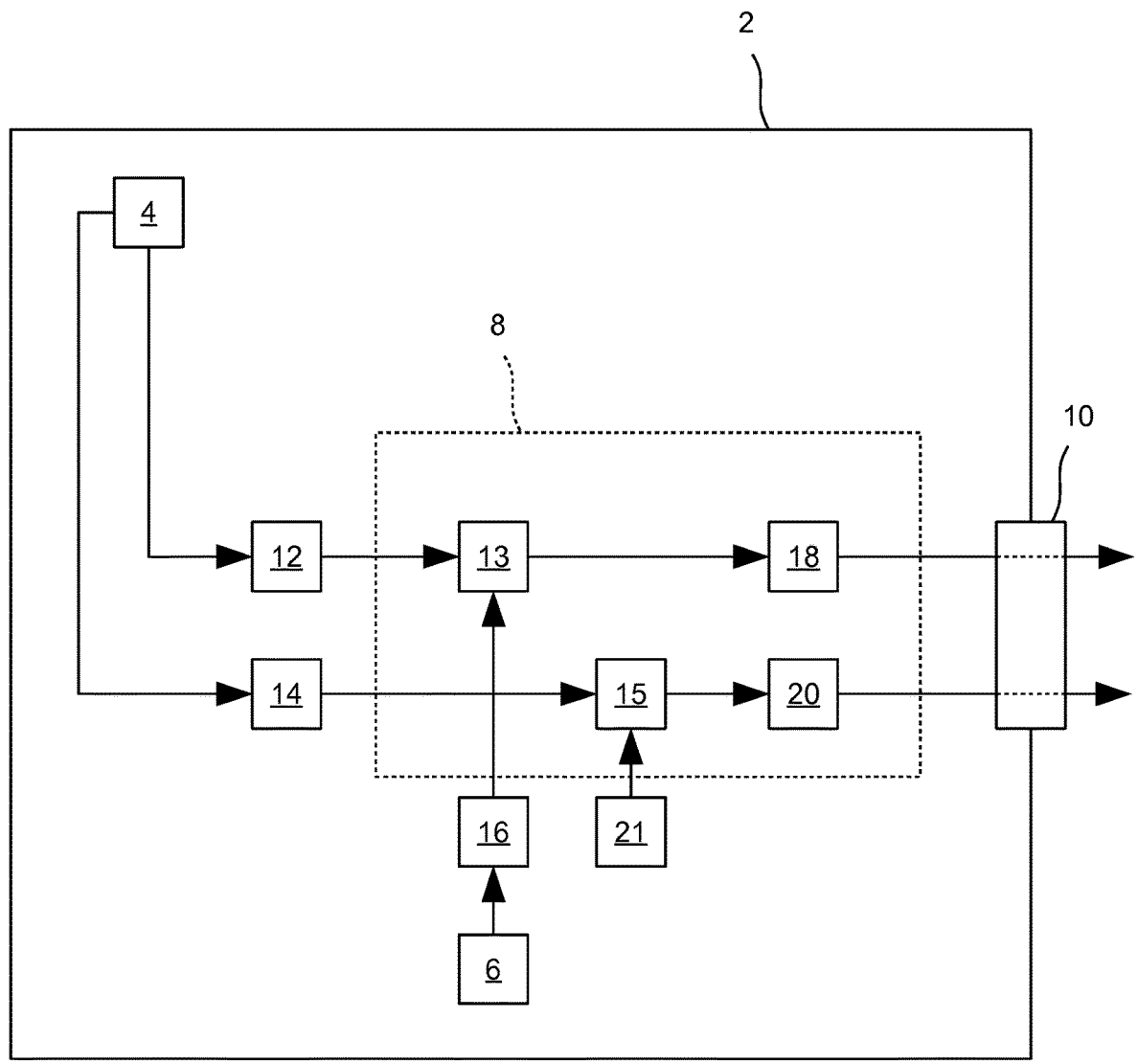
FIG. 1 shows a schematic block diagram of a device.

FIG. 1 shows schematic block diagram of a primary radio communications device 2 to operate in a radio communications network. The primary radio communications device 2 comprises a processor 4, an alignment means 6, a transceiver 8, and a radio module 10.

The processor 4 determines a pilot 12 preferably in dependence on a pilot sequence, for example a Zadoff-Chu sequence, a Walsh-Hadamard code or the like. The pilot 12 can e.g. include a pilot signal or a training signal or a reference signal, or in particular a channel state information reference signal, CSI-RS, or a sounding signal. The pilot 12 is determined for the example of Zadoff-Chu sequences by choice of sequence root and/or by a cyclic shift of the pilot sequence, which is known to both the primary and secondary radio communications device. Furthermore, the processor 4 determines further data 14 to transmit to a secondary radio communications device not shown in FIG. 1.

The alignment means 6 is configured to align a carrier configuration 16 of a first time-frequency resource 18 with a carrier configuration of the first time-frequency resource 18 used by a neighbouring primary radio communications device not shown in FIG. 1.

The transceiver 8 is configured to allocate the first time-frequency resource 18 and modulate the pilot 12 with the aligned carrier configuration 16 onto a multi-carrier modulated signal via respective modulation means 13, respectively. Furthermore, the transceiver 8 comprises a modulation means 15 which is configured to allocate a second time-frequency resource 20 and modulate the further data 14 with a further carrier configuration 21 onto the multi-carrier modulated signal. The modulation means 13 and 15 may be embodied as one unit. The further carrier configuration 21 may differ from the aligned carrier configuration 16. The aligned carrier configuration 16 is selected to increase the probability that the aligned carrier configuration 16 of the shown first primary radio communications device 2 corresponds to a further aligned carrier configuration of the neighbouring primary radio communications device. When the carrier configurations 16 for pilots 12 of a plurality of neighbouring primary radio communications devices 2 correspond to each other, secondary radio communications devices benefit from reduced inter-carrier interference with regard to the received pilots 12.

The alignment means 6 is preferably embodied as an encoded machine-executable program, which is stored on a machine-readable medium. In the event of a demand for coordination and for alignment of the carrier configuration 18, in particular the subcarrier parameter, the program is loaded from the machine-readable medium and is executed by a processor. The program also can be loaded on start-up of the respective system or processor and can remain in an idle state until the coordination demand is triggered. However, the alignment means 6 can be also embodied as a hardware component.

The modulation means 13 and 15 are preferably embodied as a hardware component. The modulation means 13 and 15 rely on a waveform which is able to multiplex different air interface configurations, in particular different carrier configurations 18, in particular different subband parameters, on the same carrier. Therefore, the modulation means 13 and 15 is able to modulate a plurality of data, in particular the pilot 12 and the further data 14, via the same carrier using different subband parameters at the same point in time. Furthermore, the modulation scheme used by the modulation means 13 and 15 can comprise Quadrature Phase-Shift Keying, Quadrature amplitude modulation or the like.

The carrier configurations 16 and 21 refer to at least one property of the carrier and/or a modulation/demodulation scheme. The carrier configurations 16 and 21 can be also termed subband parameter. The carrier configurations 16 and 21 can be also referred to as numerology. The carrier configurations 16 and 21 comprise and may differ in at least one of the following properties:
  symbol duration,
  subcarrier spacing,
  time overhead,
  time overhead type (e.g. zero postfix or cyclic prefix)
  windowing or filtering parameters (length and/or actual coefficients),
  waveform parameters,
  DFT-spreading, active or not, or any other sort of 2-D thus time-frequency transformation applied prior to multicarrier modulation.

According to an embodiment the alignment means 6 comprises a memory means on which the aligned carrier configuration 16 is stored as at least one preconfigured value. This means, that the aligned carrier configuration 16 can be pre-configured at installation time of the primary radio communications device 2 therefore providing an alignment with further carrier configurations 16 of a neighbouring primary radio communications device 2.

Figure 2:
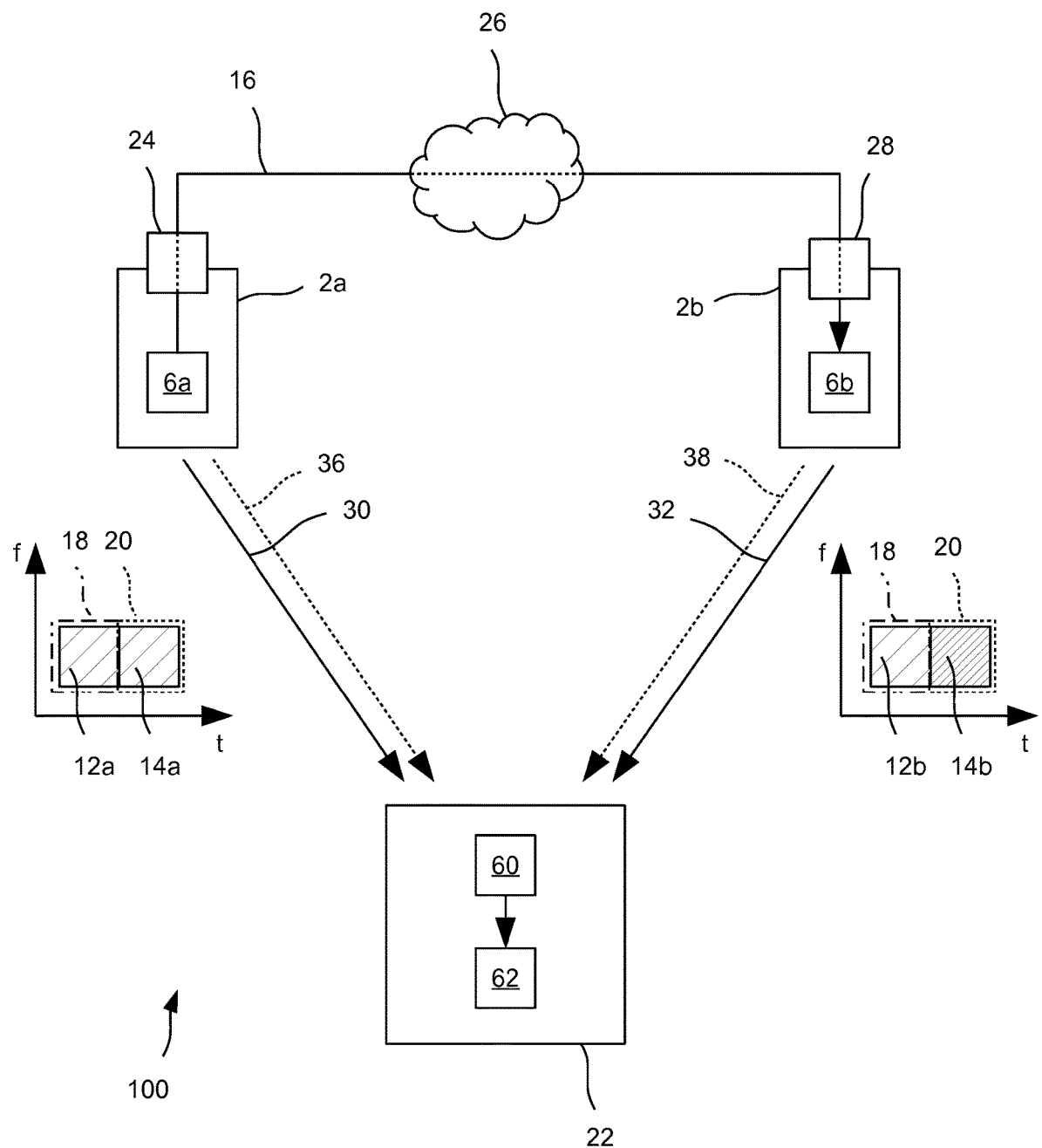
FIGS. 2, 3 and 6 show a schematic diagram of a radio communications network, respectively.

FIG. 2 shows a schematic diagram of a radio communications network 100 with a first primary radio communications device 2a, a second primary radio communications device 2b and the secondary radio communications device 22. Both primary radio communication devices 2a and 2b can resid at neighbourhood locations, so that the secondary radio communications device 22 can receive signals from both primary radio communication devices 2a and 2b. The aligned carrier configuration 16 is determined by the alignment means 6a of the first primary radio communications device 2a. The first primary radio communications device 2a comprises an interface 24 to transmit the aligned carrier configuration 16 via an information channel 26 and a respective interface 28 of the second primary radio communications device 2b to the second primary radio communications device 2b. The alignment means 6b of the second primary radio communications device 2b receives the aligned carrier configuration 16. Therefore, the aligned carrier configuration 16 is exchanged and coordinated between the first and second primary radio communications devices 2a and 2b. Therefore, both primary radio communication devices 2a and 2b are provided with the same aligned carrier configuration 16. The second primary radio communications device 2b comprises essentially the same functionality of the first primary radio communications device 2a.

The interfaces 24, 28 are intended to exchange information between primary radio communications devices 2 even on different hierarchy levels like primary radio communications devices 2 for a pico- or micro-cell.

According to an embodiment the interfaces 24, 28 are an LTE X2 interface, respectively.

The first primary radio communications device 2a transmits radio signals 30 to the secondary radio communications device 22. The second primary radio communications device 2b transmits radio signals 32 to the secondary radio communications device 22. A first pilot 12a originating from the first primary radio communications device 2a and a second pilot 12b originating from the second primary radio communications device 2b are transmitted in the same time-frequency resource 18 with the aligned carrier configuration 16. In the second time-frequency resource 20 which is not bound to the aligned carrier configurations 16 first further data 14a and second further data 14b are transmitted to the secondary radio communications device 22.

In the case that the first and second primary radio communication devices 2a and 2b represent individual base stations or individual transmission points like a remote radio head, the information channel 26 represents a backhaul network. Accordingly the radio signals 30 and 32 are transmitted in a downlink direction. The neighbouring primary radio communications devices 2 therefore provide overlapping radio cells. In an embodiment the pilots 12 are Channel State Information Reference Signals, CSI-RS. Each primary radio communications device 2 may transmit multiple pilots in parallel, e.g. one per antenna port which are orthogonalized or separated via time and/or frequency and/or code.

In an alternative embodiment the first and second primary radio communication devices 2a and 2b represent user equipments or machine equipments. The secondary radio communications device 22 represents an individual base station or individual transmission point like a remote radio head. Accordingly the radio signals 30 and 32 are transmitted in an uplink direction. In an embodiment the pilots 12 are sounding symbols.

The first time-frequency resource 18 is time-multiplexed with the second time-frequency resource 20. Therefore the first and second time-frequency resources 18 and 20 are separated in time. In an embodiment not shown the first and second time-frequency resources 18 and 20 are separated in frequency according to a frequency-multiplexing scheme. The time-multiplexing and/or frequency-multiplexing result according to an intersection of the first and second time-frequency resources 18, 20 is zero.

Via signals 36 and 38 the primary radio communication devices 2a and 2b transmit the information that the radio signals 30 and 32, respectively, will be transmitted via the first time-frequency resource 18 using the aligned carrier configurations 16. The signals 36, 38 can be configured to be sent to a specific group of secondary radio communications devices 22 by configuration of the radio resources, e.g. by bi-directional radio resource configuration signalling. According to an embodiment the signals 36, 38 are broadcast signals. The signals 36, 38 further comprise information with regard to the second time-frequency resource 20 that respective further carrier configurations 21 are used.

Figure 3:
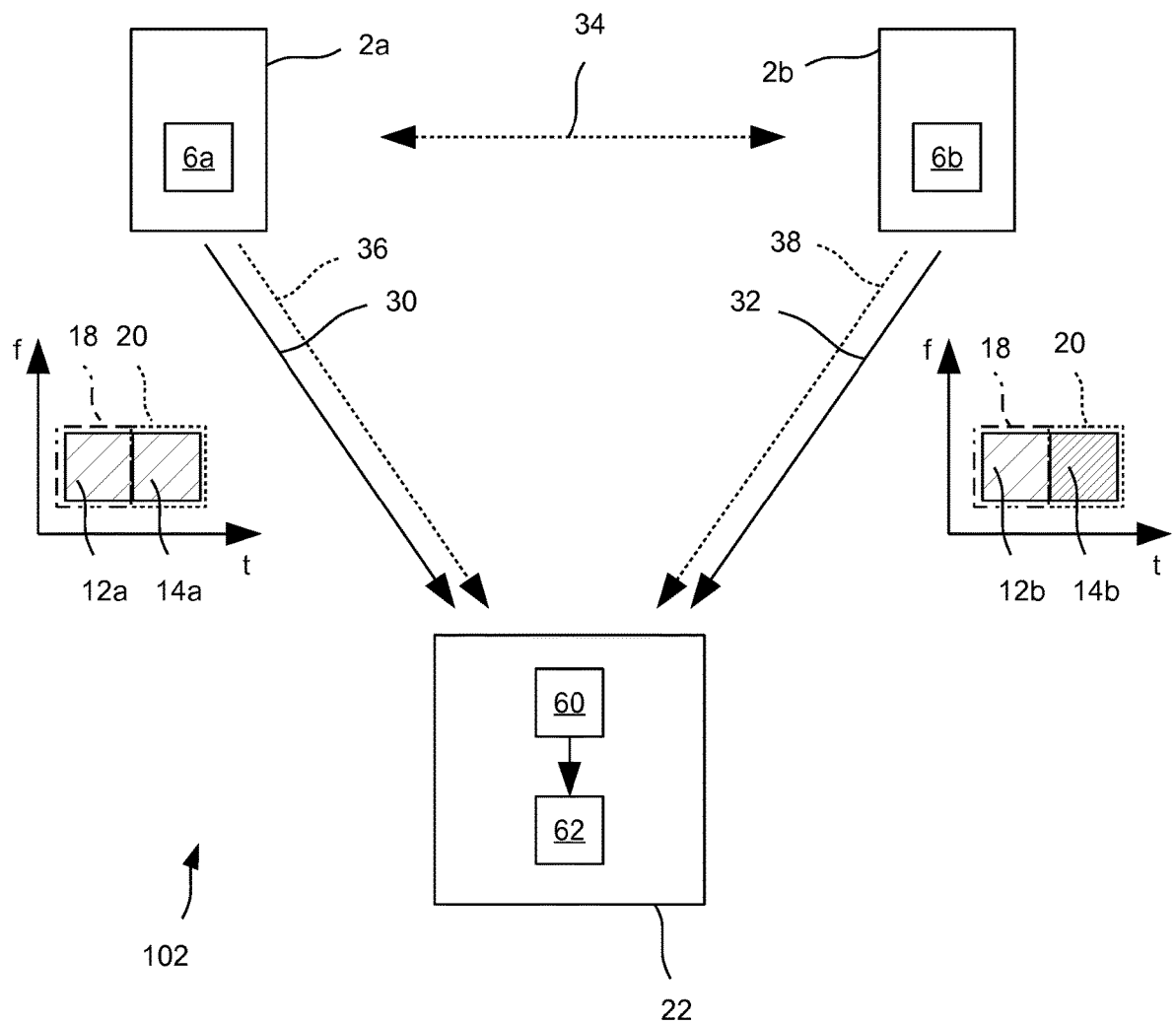

FIG. 3 shows a schematic diagram of a radio communications network 102 with the first primary radio communications device 2a, the second primary radio communications device 2b and the secondary radio communications device 22. According to FIG. 2 an explicit alignment of the carrier configuration 16 between the first and second primary radio communications devices 2a and 2b is established. This explicit alignment can be also termed coordination of the aligned carrier configurations 16 and may be part of a communications protocol.

With difference to FIG. 2 in FIG. 3 it is shown an implicit alignment of the carrier configurations 16 illustrated by the double arrow 34. This implicit alignment of the carrier configurations 16 for the first time-frequency resource 18 is established in an embodiment by pre-configuration of the first and second radio communications devices 2a and 2b.

The implicit alignment of carrier configurations may comprise sorting of the carrier configurations in frequency direction.

As a result of the explicit or implicit alignment of the carrier configuration 16 a plurality of neighbouring primary radio communications devices 2a and 2b apply the same aligned carrier configurations 16 for the transmission of the respective pilots 12 via a time-frequency resource 18 so that a secondary radio communications device 22 is able to receive a plurality of pilots 12 from different primary radio communications devices 2. At the same time further data 14 may be transmitted by using further carrier configurations 21. In the example shown the pilots 12a, 12b and also the further data 14a, 14b are code-multiplexed. Of course other multiplexing techniques like frequency-multiplexing of the pilots 12a, 12b and/or the further data 14a, 14b are possible.

Regarding the further data 14 different carrier configurations 21 may be applied on an overlapping region of the time-frequency resource 20 for example by using spatial multiplexing (for example multi-user—multiple input multiple output method, MU-MIMO) or code multiplexing.

The secondary radio communications device 22 comprises an estimator means 60 to determine an estimate 62. The estimate 62 comprises an estimation of a radio channel from the primary radio communications device 2a, 2b to the secondary radio communications device 22. The estimator means 60 is preferably embodied as a hardware component.

Figure 4:
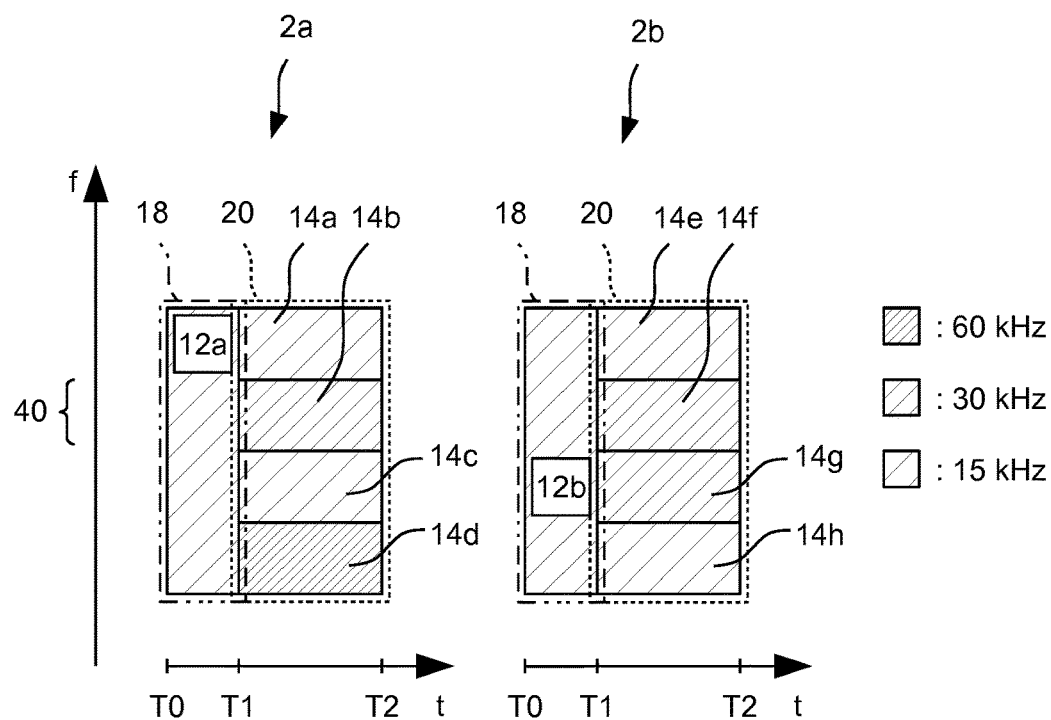
FIGS. 4 and 5 show a schematic time-frequency diagram, respectively.

FIG. 4 shows a schematic time-frequency diagram. Starting with a point in time T0 both first and second primary radio communications devices 2a and 2b transmit their respective pilots 12 via the first time-frequency resource 18 with the aligned carrier configurations 16. In the present embodiment the carrier configuration 16 is represented by a subcarrier spacing of 15 kHz. Furthermore, in the present embodiment the first time-frequency resource 18 spans a plurality of resource tiles 40. A resource tile is defined as a time-frequency region where certain carrier configurations are applied on each of the respective resources 18 and 20.

Further examples of subcarrier spacings of 30 and 60 kHz are provided as carrier configurations. The symbol durations are reduced by factor 2 or 4, respectively.

Starting with a point in time T1 the first and second primary radio communications devices 2a and 2b start to transmit the further data 14 via the second time-frequency resource 20, wherein the respective carrier configurations 21 in form of the subcarrier spacing differ between the transmissions of the further data 14 originating from the respective first and second primary radio communications devices 2a and 2b. However, as outlined to FIG. 6, the carrier configuration 21 of the second time-frequency resources 20 may be also aligned between the first and second primary radio communication devices 2a and 2b. For example, the carrier configurations 21 for the transmission of the further data 14a, 14e, 14b and 14f are aligned. The shown time-multiplexing of the pilots 12 in the first time-frequency resource 18 and the further data 14 in the second time-frequency resource 20 avoids inter-subcarrier interference.

When multiple different carrier configurations 16 are applied for the first time-frequency resource 18 by neighbouring primary radio communications devices 2, there may exist boundaries between geographic regions, i.e. sets of primary radio communications devices 2, applying a specific carrier configuration 16 that may differ between regions and that may change over time. Therefore having a primary radio communications device 2 with different carrier configurations on the very same time-frequency resource 18 may still occur.

Figure 5:
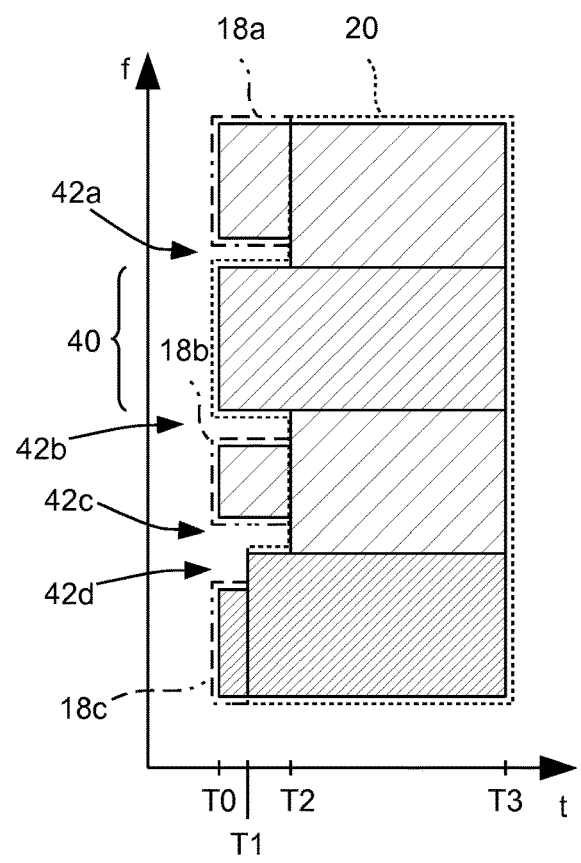

FIG. 5 shows a further schematic time-frequency diagram. First time-frequency resources 18a to 18c are time- and frequency-multiplexed and therefore separated in time and frequency. Furthermore, the aligned carrier configuration 16 of the first time-frequency resource 18c differs from the aligned carrier configuration 16 of the first time-frequency resources 18a and 18b. Therefore, different aligned carrier configurations 16 are transmitted for different first time-frequency resources 18 in the same period of time, for example from the point in time T0 to the point of time T2. This provides to cover further use cases or services for example with respect to a velocity of the secondary radio communications device 22 latency reduction or radio coverage extension.

Therefore, the transceiver 8 is configured to allocate a first one 18a of first time-frequency resources 18 with a first aligned carrier configuration 16, and to allocate a second one 18c of first time-frequency resources 18 with a second aligned carrier configuration 16 differing from the first aligned carrier configuration 16. The radio module 10 is configured to transmit the first pilot 12 via the first time-frequency resource 18a and to transmit the second pilot 12 via the further first time-frequency resource 18c.

Guard bands 42a to 42c separate the first time-frequency resources 18 from the second time-frequency resources 20. A guard band 42d separates the first time-frequency resources 18b and 18c.

Figure 6:
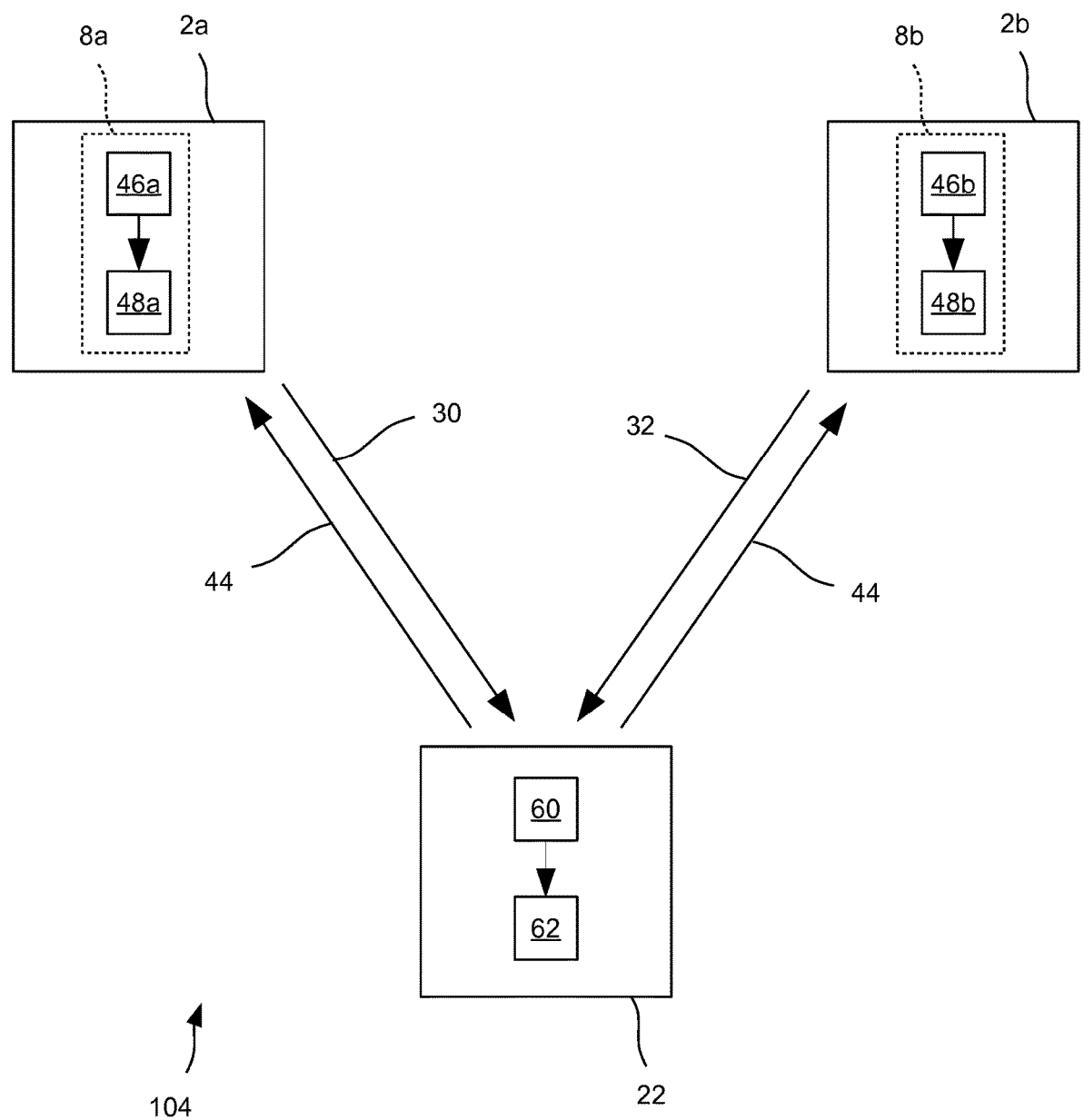

FIG. 6 shows a schematic diagram of a radio communications network 104 with the first and second primary radio communications devices 2a and 2b and the secondary radio communications device 22. The secondary radio communications device 22 transmits a service request 44 which is received by the first and second primary radio communications devices 2a and 2b. The first and second primary radio communications devices 2a and 2b comprise carrier configuration means 46a and 46b which determine the further carrier configurations 48a, 48b, respectively, in dependence on the service request 44. For the transmission of the further data 14 in the second time-frequency resources 20 the respective further carrier configuration 48a, 48b is chosen to transmit the radio signals 30 and 32, respectively. According to an embodiment the service request 44 comprises a request for short or long symbol durations.

The carrier configuration means 46a and 46b are preferably embodied as an encoded machine-executable program, which is stored on a machine-readable medium. In the event of a reception of service request 44 the program is loaded from the machine-readable medium and is executed by a processor. The program also can be loaded on start-up of the respective system or processor and can remain in an idle state until the service request 44 is received. However, the carrier configuration means 46a and 46b can be also embodied as a hardware component.

Figure 7:
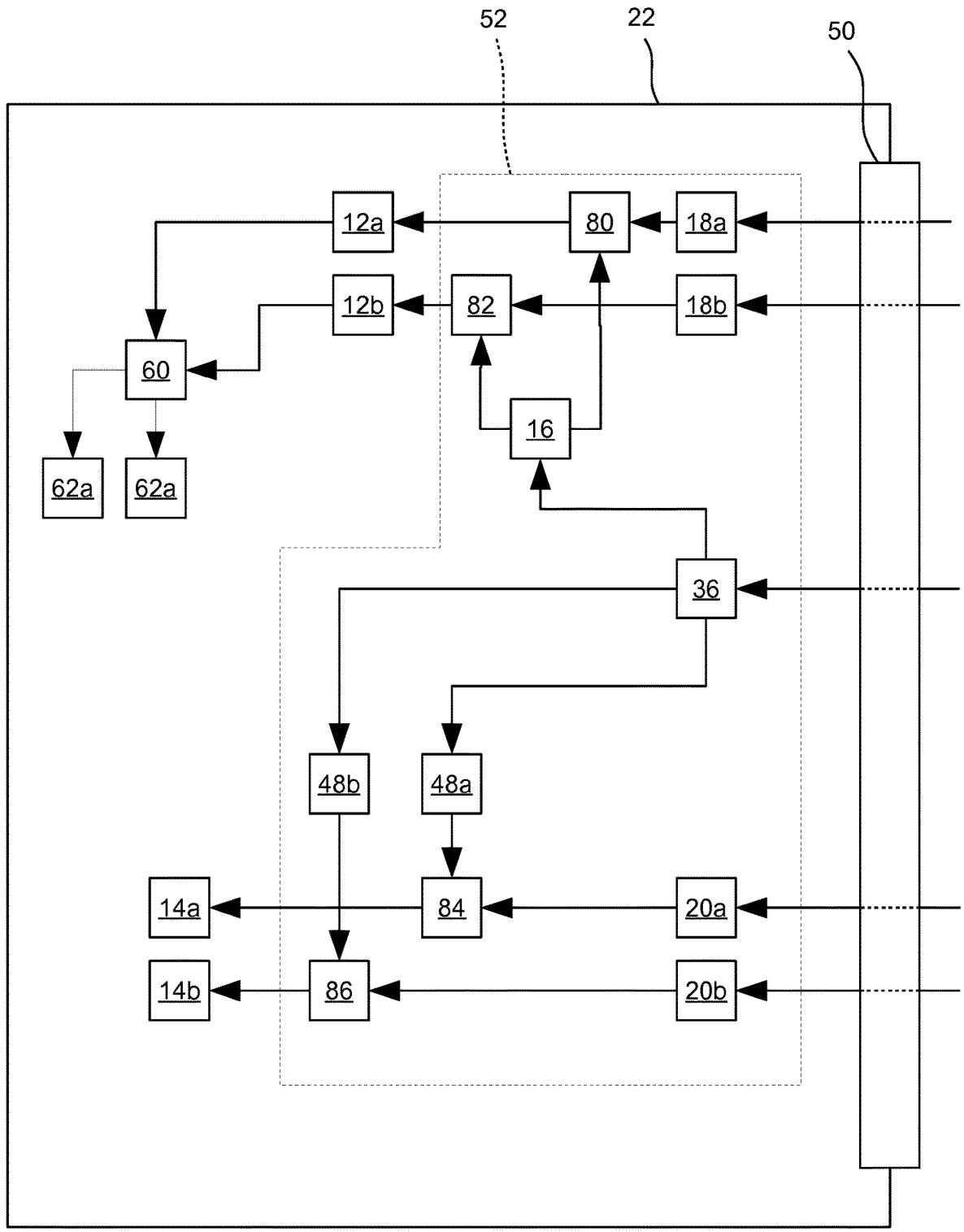
FIG. 7 shows a schematic block diagram of a user equipment.

FIG. 7 shows a schematic block diagram of the secondary radio communications device 22. The aligned carrier configuration 16 is determined from a respective signal 36 originating from a primary radio communications device 2. The signal 36 is received via a radio module 50. The transceiver 52 de-modulates first and second pilots 12a and 12b by means of de-modulation means 80 and 82, respectively. The pilots 12a and 12b are received via one first time-frequency resource 18. Further data 14a and 14b is received via one second time-frequency resource 20 and is de-modulated by respective de-modulation means 84 and 86 by making utilization of further carrier configurations 48a and 48b.

The de-modulation means 80 and 82 are preferably embodied as a hardware component. The de-modulation means 80 and 82 rely on a waveform which is able to multiplex different air interface configurations, in particular different carrier configurations 16, 21, in particular different subband parameters, on the same carrier. Therefore, the de-modulation means 80 and 82 are able to de-modulate a plurality of data, in particular the pilot 12 and the further data 14, received via the same carrier using different subband parameters at the same point in time. Furthermore, the de-modulation scheme used by the de-modulation means 80 and 82 can comprise Quadrature Phase-Shift Keying, Quadrature amplitude de-modulation or the like. The radio module 10 and the transceiver 8 of the primary radio communications device 2 and the radio module 50 and the transceiver 52 of the secondary radio communications device 22 are configured to transmit and receive a waveform of the OFDM, Orthogonal Frequency-Division Multiplexing, family, namely cyclic prefix OFDM, CP-OFDM, filtered OFDM, f-OFDM, Universal-Filtered OFDM UF-OFDM, windowed OFDM (including windowed overlap- and add OFDM, WOLA) or even Single Carrier Frequency Division Multiple Access, SC-FDMA.

If the secondary radio communications device 22 receives and demodulates only further data 14a only then only a single service is received.

If the device 22 receives and demodulates two or more of further data 14a through 14d (with reference to FIG. 4) then multiple services are received.

user equipment If the secondary radio communications device 22 receives and demodulates further data 14a and 14e (with reference to FIG. 4) from different primary radio communications devices 2 then a coordinated multipoint, CoMP, transmission scheme is used like joint transmission, JT.

If the device 22 receives and demodulates the further data 14a and/or 14c as well as 14e and/or 14h (with reference to FIG. 4) then a single service is provided via multiple connectivity.

If the secondary radio communications device 22 receives and demodulates the further data 14a and/or 14c as well as 14f and/or 14g (with reference to FIG. 4) then multiple services are provided via multiple connectivity.

If the secondary radio communications device 22 receives and demodulates further data 14a and 14c (with reference to FIG. 4) one single service is provided via one primary radio communications device 2.

If the secondary radio communications device 22 receives and demodulates the further data 14a, 14b, 14c and 14d (with reference to FIG. 4 then multiple services are provided by means of a single primary radio communications device 2.

The aforementioned embodiments relate in particular to a device (2, 2a, 2b) to process a channel state information reference signal CSI-RS (12, 12a, 12b) and further data (14, 14a, . . . , 14h) to be transmitted via a first radio module (10) of a radio communications network (100, 102, 104), in which data to be transmitted is mapped on subcarriers and in the radio module (10) subsequently up-converted to a radio frequency higher than the subcarrier frequencies, wherein the subcarriers are grouped into frequency subbands, and wherein at least one subband is scalable with at least one subband parameter for a period of time, wherein a subband parameter is in particular a subcarrier spacing, and wherein in at least one subband at least two different parameters, in particular subcarrier spacings, can be used, wherein the device (2, 2a, 2b) comprises at least a processor and a memory, and is configured to:
    determine a first CSI-RS (12a) and a second CSI-RS (12b),
    determine first further data (14a, . . . , 14d) and second further data (14b, 14 e, . . . , 14h);
    allocate for a first period of time the first CSI-RS (12a) to a first subband and the second CSI-RS (12b) to a second subband of a time-frequency resource (18),
    allocate for a second period of time subsequent to and different from the first period of time the first further data (14a, . . . , 14d) to the first subband and the second further data (14b, 14 e, . . . , 14h to the second subband, and
    map the first CSI-RS (12a), the second CSI-RS (12b), the first further data (14a, . . . , 14d) and the second further data (14b, 14 e, . . . , 14h) to subcarriers corresponding to the allocated subbands.

In a further embodiment the device (2, 2a, 2b) the device (2, 2a, 2b) is further configured to: —allocate for a first period of time a common subband parameter, in particular the same subcarrier spacing, to both the first and the second subband and to allocate for the second period of time a subband parameter different from the common subband parameter to at least the second subband.

In a further embodiment the device (2, 2a, 2b) is further configured to: —allocate for the first and the second period of time a common first subband parameter, in particular the same subcarrier spacing, to the first subband, and to allocate for the first and the second period of time a common second subband parameter, different from the first subband parameter, to the second subband.

In a further embodiment the device (2, 2a, 2b) is further configured to: —allocate for the first period of time a guard band between the first subband and the second subband, the first and the second subband being adjacent in frequency.

In a further embodiment the device (2, 2a, 2b) is further configured to: —align for at least the first period of time one subband parameter, in particular a subcarrier spacing, of the first subband with a corresponding subband parameter of a corresponding subband used or to be used by a second radio module.

In a further embodiment the further data includes at least two of the following: end user data, end user radio resource control, demodulation reference signal.

The aforementioned device to process a reference signal, in particular a channel state information reference signal, and further data is in particular a processing part of a base station. The base station could be an LTE eNodeB, a 5G transmission point, a WiFi access point, or else. The base station is in particular suitable to serve a radio cell and to connect user equipment inside the cell to the radio network. The base station is e.g. implemented as a stand-alone equipment including e.g. a processing part and a radio module, or as a processing part and a remotely located so called RRH (Remote Radio Head). The processing part is e.g. implemented using a processor and a memory. The processor is implemented using e.g. a DSP, FPGA, or the like or a combination thereof. The memory is implemented using e.g. a RAM, ROM, DDR, Flash memory, or the like, or a combination thereof. The memory stores e.g. computer readable instructions, thus instructions executable by the processor. The processing part processes data to be transmitted to the user equipment. The processing includes the steps necessary to fulfil the requirements set by the radio network. The processing part thus includes e.g. a channel coder to code the data to be transmitted, an interleaver, a constellation mapper, a serial-to-parallel converter, a linear pre-coder, a carrier mapper to map the data and the pilots to be transmitted on subcarriers, a inverse FFT modulator, a cyclic prefix adder, a parallel-to-serial converter, and a framing module to add the preamble and to construct the frame to be transmitted. The aforementioned modules could be placed in serial order. Some modules might be duplicated to enable parallel processing, some modules might not be used or replaced by others dependent on the technology used. The functions of the modules relate to digital signal processing and could thus be implemented using a processor like a digital signal processor, or the like. At least some of the functions relate to baseband processing and could thus be implemented using a transceiver, e.g. a baseband transceiver. The radio module is e.g. a radio module, or a remotely located so called RRH (Remote Radio Head). The constellation with a RRH is often used in connection with a so called NFV (Network Functions Virtualization) implementation, where a substantial part of processing is centralized in a server farm with a plurality of processors and a plurality of memory, and the radio specific up-conversion, the antenna and the digital-to-analog converter for data transmission in downlink to the user equipment and the analog-to-digital converter for receiving data from the user equipment in uplink is remotely located. The radio module is also called radio frontend and includes e.g. a digital-to-analog converter, a low-pass filter, a mixer, a local oscillator, a power amplifier and an antenna. The local oscillator generates the radio frequency which is mixed on the processed data. The aforementioned modules could be placed in serial order. Some modules might be not be used or replaced by others dependent on the technology used. For MIMO or massive MIMO some modules need to be duplicated, e.g. a plurality of antennas is used instead of one and corresponding amplifiers, etc. Additional modules might be added for performing and/or supporting specific functions as e.g. beamforming, CoMP (coordinated multipoint), eICIC (enhanced inter-cell interference control), or the like. User equipment (UE) could be implemented as a device with a radio module, e.g. smartphone, tablet, smartwatch, sensor, actuator, equipment inside a vehicle, machine-to-machine equipment, or else. The radio network is e.g. an OFDM (Orthogonal Frequency Division Multiplex) type network, e.g. UF-OFDM, F-OFDM, ZT-s-OFDM, P-OFDM, FC-OFDM, or another multi-carrier network, e.g. FS-FBMC, QAM-FBMC, etc. E.g. QAM—Quadrature Amplitude Modulation and/or QPSK-Quadrature Phase Shift Keying are used as modulation technique. The radio network allocates resources using a scheduler and a time-frequency-resource grid, a t-f-resource. The t-f-resource includes time slots and associated subcarriers. The subcarriers are e.g. grouped in frequency subbands. A subband is assigned at least one subband parameter. A subband parameter is e.g. subcarrier spacing, other parameters are e.g. symbol duration, time overhead, time overhead type like zero postfix or cyclic prefix, windowing or filtering parameters. Dependent on the assigned or selected parameters the subband is characterized for a specific transmission type and is in particular suitable for the transmission of specific services. A service is e.g. eMBB (enhanced mobile broadband), mMTC (massive machine-type-communication), URLLC (ultra reliable low latency communication), vehicle-to-vehicle communication, voice, video, etc. An allocated resource block thus assigns a dedicated time slot associated with one or more subcarriers or a subband to a data packet. A resource block assigns one time slot to a subcarrier. A time slot is e.g. called a TTI (transmission time interval). The period of time could e.g. be one or more time slots. Data and control signals are transmitted using physical channels, e.g. physical downlink shared channel, physical downlink control channel, common control physical channel. Further data and control signals could be transmitted using broadcast channel, paging channel, multicast channel. Some parameter values are e.g. subcarrier spacing: 15 kHz, 30 kHz, or 60 kHz; cyclic prefix: 4.7 us, 2.4 us, 1.2 us, or 0.6 us; subframe: 500 us, 250 us, 125 us, or 67.5 us; symbols per subframe: 7 or 6; FFT size: 128, 256, 512, or 1024; scalable bandwidth: 1.25 MHz, 2.5 MHz, 5 MHz, 10 MHz, or 20 MHz; TTI 1 ms, or ⅛ ms. The alignment of a subband parameter of a subband to a subband parameter of a subband of another radio antenna includes e.g. the following constellation: A first base station serves a first cell and is connected with a first UE, and a second base station serves a second cell and is connected to a second UE. The second base station is a neighboring base station to the first one, their cells could overlap, the second base station could also be a small cell located inside the cell of the first base station. The first base station has e.g. a first subband, e.g. a 720 kHz band at a certain frequency position, and is enabled to configure in a flexible way one or more parameters of the subband. Such parameter is e.g. the subcarrier spacing. E.g. the base station can configure the subband to operate with a 15 kHz spacing, a 30 kHz spacing, or a 60 kHz spacing. The second base station has e.g. also the first subband, e.g. a 720 kHz band at the same certain frequency position, and is also enabled to configure in a flexible way one or more parameters of the subband. Such parameter is e.g. also the subcarrier spacing. E.g. the second base station can configure the subband to operate with a 15 kHz spacing, a 30 kHz spacing, or a 60 kHz spacing. To reduce interference between the base stations and/or the UEs, the first and the second base station align their subcarrier spacing in the specified subband, at least in the first period of time. This alignment can be performed in different ways. One way is coordination by a master-slave procedure. The first base station is acting as a master, assigns the subcarrier spacing to the first subband, and informs the second base station, e.g. via a X2 interface, of the assignment. The second base station acts as a slave and adapts its assignment to the assignment of the first base station. Example 1: first base station assigns 30 kHz subcarrier spacing, second base station assigns 30 kHz subcarrier spacing. As subcarrier spacing is only one parameter and base stations need to fulfil several requirements, e.g. service requests, the overall load of the base station, etc. the second base station may not use the identical subcarrier spacing, but a subcarrier spacing closer to the best choice, e.g. first base station assigns 60 kHz subcarrier spacing, second base station assigns 30 kHz subcarrier spacing, and not 15 kHz. Another way of alignment is e.g. a coordination device located outside of the base stations, or e.g. in NFV a centralized scheduler in the server farm. The coordination device receives information from the base stations which enables the device to provide alignment information to the base station. Such alignment information helps the base station to align the specific parameters without exchanging information with the neighbour base station. The alignment information could include a subcarrier spacing to be used, e.g. 15 kHz, during a period of time, e.g. the first period of time. This way neighboring base stations use e.g. during the first period of time a 15 kHz subcarrier spacing to transmit the CSI-RS. In a further embodiment, the alignment information could include a sorting algorithm, which could e.g. be provided by the device via a backhaul connection during operation or the base station could be preconfigured with such algorithm. The algorithm could be updated from time to time. The base station could e.g. instruct the base station to use higher subcarrier spacings, e.g. 60 kHz, for lower frequency subbands and lower subcarrier spacing, e.g. 15 kHz, for higher subbands, and 30 kHz in-between. A base station could also be preconfigured with specific subbands where assigning different subcarrier spacings is not allowed and others where subcarrier spacing assignment is allowed. For the latter one the active coordination or the sorting procedure could be implemented. Assignments for downlink and uplink traffic may follow the same, a similar or a different rule.

At least parts of the above described radio communications network including sender and/or receiver could be implemented using network functions virtualization (NFV). NFV is a network architecture that makes use of technologies of computer virtualization. Entire network equipment like sender or receiver or parts thereof or part of their functions can be virtualized using software building blocks that may connect, or interact, to create communication services. A virtualized network function of e.g. a sender or receiver may include at least one virtual machine running different software and processes, on top of standard high-volume servers, switches and storage, or a cloud computing infrastructure, instead of having customized hardware appliances for each network function. As such a sender or receiver function may be implemented in a computer program using a computer program product embodied on a non-transitory computer readable medium for performing operations, wherein the computer program product comprises instructions, that when executed by a processor, perform the operations of the specific base station, eNodeB, network node, MME (Mobility Management Entity) and/or UE function.

The choice of multi-carrier numerology is driven by the propagation environment and the services to be supported: Short symbol durations and thus larger subcarrier spacings are desirable for low latency and high velocity use cases. Long symbol durations and thus smaller subcarrier spacings are attractive for high delay spreads and multicast/broadcast services. The answer of LTE design to these issues was a compromise numerology that traded off the objectives of all purposes (with the exception of MBMS where a long CP could be time multiplexed). This compromise has its limitations with respect to supporting newer traffic requirements, such as high velocities and low latencies. A frequency multiplex is better suited when combining URLLC and NR MBMS, as the time multiplex would compromise the low latency targets. When trying to aim for a single numerology per carrier with a compromise numerology for URLLC, the TTI will contain only very few OFDM symbols, which especially in the uplink either creates pilot overhead- or PAPR issues.

An attractive possibility for NR is when the network can pick the appropriate multi-carrier parameters for the respective propagation environment and service needs of each user (to keep the effort required for this functionality at a reasonable level a code-book based approach is to be preferred, i.e. based on measurements, delivered service and device characteristic the respective table entry is selected). In principle, different optimized configurations (e.g. in terms of numerology) for the broad range of new radio use cases can be addressed by:

1. using different carriers, each with its adjusted parameter setting (subcarrier spacing) bundled by carrier aggregation.

2. or by relying on a waveform which is able to multiplex different air interface configurations for the different use cases side-by-side on the same carrier in an FDMA manner.

The second option provides multiplexing gains, as the load per service typically varies over time and space. Resources allocated to different type of services can be dynamically shifted, generating increased flexibility. This ensures a more efficient use of carriers. While the multiplexing of different services, each with optimized configurations, is aligned with respective requirements and contains the advantages mentioned above, basic CP-OFDM (including state-of-the-art solutions with a full band carrier filter for LTE spectral mask fulfilment) would significantly suffer from inter-carrier interference due to poor in-carrier spectral localization.

The above described aspects suggest that user-specific numerology is highly desirable for new radio. For high velocity and low latency use cases, performance benefits of the numerology adaptation are: Compared to the LTE frame structure based on 15 kHz subcarrier spacing, for high velocities a NR adjustment with 30 kHz subcarrier spacing could prevent a factor 3 loss in spectral efficiency. On the other hand 15 kHz was still better for low velocities, motivating a switching of numerology.

A second example is an uplink low latency setup when considering pilot overhead and pilot boosting. Here 30 kHz subcarrier spacing could show around 20% higher spectral efficiency, compared to 15 kHz. Both examples thus show use-case-specific and propagation-condition-specific adaptation of numerology is beneficial.

It is proposed a UE/service-specific numerology by taking into account complexity and testing burden.

A prerequisite for mixed numerologies is a waveform which enhances basic OFDM in terms of in-carrier spectral localization. Otherwise, when using only basic OFDM, there may be strong drawbacks, which can be observed in the waveform comparison results. As mentioned, filtering and windowing are both options. Subband-filtering has been shown as the stronger alternative in terms of spectral efficiency, compared to windowing, which also holds when the impact of the power amplifier is modeled.

In principle we have several options to deal with several different numerologies inside the same carrier: The extreme cases are: Either we allow each resource block to have a different numerology. Or we split the carrier into one contiguous portion for each appearing numerology. The former alternative comes with high signalling overhead and non-negligible inter-carrier interference or guard band overhead. The second alternative does not allow for much flexibility in resource usage. For this reason we suggest to consider alternatives in between: A tiling concept.

The basic idea of the tiling concept is the following: A tile can be seen as a configurable larger resource group chunks with homogeneous numerology or other PHY/MAC parameters (such as TTI length, waveform parameters, such as active DFT-spreading, or tight/relaxed time-frequency alignment). Each tile may have different numerology/parameters. This enables NR to provide a configurable air interface. Example tile sizes are e.g. 720 or 1440 kHz in frequency and 1 ms in time. A tile is defined as a time-frequency region of constant size. The radio frame consists of consecutive tiles in time- and frequency direction. A tile is characterized by the numerology parameters used TTI length Symbol length and subcarrier spacing Number of subcarriers per resource block Derived parameters are: Number of symbols per TTI, number of TTIs per tile, number of subcarriers per tile and number of resource blocks per tile.

A tile consists of consecutive resource blocks in time- and frequency direction

A resource block is the smallest possible allocation unit

Each 5G profile (set of supported tile types etc.) can use its own types of tiles, i.e. a new profile can provide a new tile type appropriate for a certain purpose not known today.

Two different tiles types; one with and one without CSI-RS

As C-RS is dropped, the question is: how good are the CSI-RS for measurements, how often are they needed. Baseline solution could be one CSI-RS per tile.

The basic usage of tiling could be that the scheduler pre-allocates resource tiles, according to service and user demands in a time structure given by the tile sizes, e.g. 1 ms. Each tile uses its own TTI length and numerology from a predefined set. The "1-D" scheduling is then carried out within the tiles. In case the pre-allocated URLLC tiles are not sufficient, a pre-emption is possible.

It is proposed: Grouping of resources into tiles with same numerology should be considered as a solution for enabling mixed numerology and a configurable air interface.

This section deals with the options for the level of multi-cell coordination of tiles which are available and its potential handling (Multi-cell aspects of the tiling concept). Different service requirements (e.g. low latency, high speed) lead to different parameterization of the time-frequency allocation of the user (e.g. different subcarrier spacings and symbol lengths, respectively). During the connection setup, a user informs the network about its service requirements. This set of requirements and the derived physical parameters are the basis of an implicit (without signaling exchange between TPs) or explicit (with signaling exchange between TPs) coordination between neighboring TPs with the aim to minimize mutual interference between cells. The assignment of radio resources for the UEs is based on the coordination. As an example: UEs with a certain numerology are preferably scheduled in a certain frequency sub-band. The principle applies for both uplink and downlink.

A first set of devices requests means for coverage extension, e.g. smart meters installed in the basement of buildings. The derived physical parameter needed for these devices is a long OFDM-symbol duration. Simultaneously, a second set of devices requests stringent means for ultra low latency, e.g. for road safety messages. The derived physical parameter needed for these devices is a short OFDM-symbol duration. Both sets of devices indicate their respective requirement during connection set-up. Hence all TPs are aware of the requirements of their respective connected devices and configure the assigned radio resources accordingly.

As a next step, the TPs exchange the service triggered configuration of the connection. Explicit coordination can be established via backhaul. The aim of this explicit coordination is that all TPs schedule UEs utilizing the same numerology, e.g. signals with 30 kHz subcarrier spacing in one particular frequency subband, as far as this is possible. Please note that the number of allocations with a certain numerology may be different for each TP. The coordination includes therefore the possibility to postpone the service of a certain UE in order to achieve a better match between the TPs in each Transmission Time Interval (TTI).

Implicit multi-site coordination of time-frequency chunks can be established by sorting. As one option the coordination of time-frequency chunks is done implicitly, i.e. without explicit exchange of the current configuration between different TPs. This can be easily achieved by sorting the allocations e.g. according to increasing subcarrier spacing. All transmission points transmit the allocations with 15 kHz subcarrier spacing (blue boxes in FIG. 3) preferably in one certain part of the system bandwidth, and all allocations with 30 kHz subcarrier spacing (orange boxes in FIG. 3) preferably in another part of the system bandwidth. As consequence, it is more like that different TPs send or receive allocations of the same type in one particular frequency-sub-band. Also, with the same principle, the probability that numerologies causing maximal mutual interference are transmitted in the same frequency sub-band can be minimized.

Partial pre-configuration of time-frequency chunks is explained in the following. As it is very likely that in all cells a certain amount of "default" numerologies useful for a broad range of services, e.g. with 15 kHz subcarrier-spacing, will be required, it may be useful to allocate these allocations semi-statically throughout the multi-cell deployment. In other words, all TPs apply the same pattern of the "default" numerology. This would limit the addressed problem of mutual interference to the remaining part of the allocations, that can be still dynamically assigned in each cell with the required configuration (in our example 15, 30, or 60 kHz).

Numerology alignment priority table for each multi-cell coordination technique:

| Technique | Numerology Alignment priority | Remark |
| --- | --- | --- |
| Blanking of resources | 0 (none) | |
| Single cell transmission | 0 (none) | |
| Interference rejection combining (Multi-cell linear MMSE receive combining) | 1 (low) | Spatial suppression of interference also brings benefits in non-aligned numerology |
| Inter-cell interference cancellation | 2 (high - should be aligned) | Frequency-domain based IC techniques are only reasonable when the same numerology is used in the cells of interest. Time-domain IC techniques are possible without numerology alignment. |
| Coherent joint transmission | 3 (highest - must be aligned) | Coherent combining of symbols across different cells demands same numerology |

Different levels of coordination of numerology among cells are possible. The need for coordination depends on the processing technique.

It is proposed the following: New Radio should provide possibilities of at least partial numerology coordination via the inter-base-station interface (the NR variant of the X2 interface).

In the following Multi-cell reference signal- and sounding design is explained. In the mixed numerology case the properties of pilot sequences across multiple cells when different numerologies are used in different cells is an issue which needs to be addressed. When certain well defined cross-correlation properties are anticipated, e.g. supported by Zadoff-Chu sequences, there needs to be a proper way of alignment between different cells.

An appealing solution is when CSI-RS are time multiplexed with control/data transmissions. The numerology of CSI-RS is aligned among TPs, while the control/data/DMRS numerology is chosen independently and is not aligned among TPs except when e.g. UE signals is transmitted by multiple TPs (DL CoMP) or to simplify SIC processing (as discussed above). Even within a single TP different control/data numerologies may by applied on the same time frequency resources, e.g. when different UEs are served simultaneously on the same resources using spatial multiplexing (MU-MIMO). The time multiplexing is motivated from the target of avoiding inter-(sub-)carrier interference, as CSI-RS and data numerologies may differ. Note: Especially when multiple CSI-RS numerologies are applied within a multi-TP system, there may exist boundaries between regions applying a specific CSI-RS numerology. Therefore having TPs with different CSI-RS numerology on the very same time frequency resource, although not preferred, may still occur, but with the drawback of hampering inter-TP channel measurements.

It is proposed the following: New Radio should provide possibilities of reference- and sounding symbol numerology alignment across multiple cells. For those reference and sounding symbols time-multiplexing with the option of full numerology alignment across different cells should be considered.

In this description it is discussed implications on frame design stemming from mixed numerologies. Use cases and potential benefits were discussed, as well as multi-cell aspects including reference symbol- and sounding design. The resulting proposals and observations can be summarized as follows:

UE/service-specific numerology provide benefits by taking into account complexity and testing burden.

Grouping of resources into tiles with same numerology is considered as a solution for enabling mixed numerology and a configurable air interface.

Different levels of coordination of numerology among cells are possible. The need for coordination depends on the processing technique.

New Radio should provide possibilities of at least partial numerology coordination via the inter-base-station interface (the NR variant of the X2 interface).

New Radio should provide possibilities of reference- and sounding symbol numerology alignment across multiple cells. For those reference and sounding symbols time-multiplexing with the option of full numerology alignment across different cells should be considered.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A device to process a channel state information reference signal (CSI-RS) and further data to be transmitted via a first radio module of a radio communications network, in which data to be transmitted is mapped on subcarriers and in the radio module subsequently up-converted to a radio frequency higher than the subcarrier frequencies, wherein the subcarriers are grouped into frequency subbands, and wherein at least one subband is scalable with at least one subband parameter for a period of time, wherein a subband parameter is in particular a subcarrier spacing, and wherein in at least one subband at least two different parameters, in particular subcarrier spacings, can be used, wherein the device comprises:
a memory storing computer readable instructions; and
a processor configured, with the computer readable instructions, to cause the device to
determine a first CSI-RS and a second CSI-RS,
determine first further data and second further data;
allocate for a first period of time the first CSI-RS to a first subband and the second CSI-RS to a second subband of a time-frequency resource,
allocate for a second period of time subsequent to and different from the first period of time the first further data to the first subband and the second further data to the second subband, and
map the first CSI-RS, the second CSI-RS, the first further data and the second further data to subcarriers corresponding to the allocated subbands,
wherein the processor is further configured to perform a first operation or a second operation,
the first operation including:
allocating for a first period of time a common subband parameter, in particular a same subcarrier spacing, to both the first and the second subband and
allocating for the second period of time a subband parameter different from the common subband parameter to at least the second subband, the second operation including:
allocating for the first and the second period of time a common first subband parameter, in particular a same subcarrier spacing, to the first subband, and to allocate for the first and the second period of time a common second subband parameter, different from the first subband parameter, to the second subband.

2. The device according to claim 1, wherein the processor is configured to perform the second operation and the processor is further configured to:
allocate for the first period of time a guard band between the first subband and the second subband, the first and the second subband being adjacent in frequency.

3. The device according to claim 1, and wherein the further data includes at least two of the following: end user data, end user radio resource control, or demodulation reference signal.

4. The device according to claim 1, wherein the processor is configured to perform the first operation and the at least one allocated common subband parameter is transmitted to a further device.

5. The device according to claim 1, wherein the processor is further configured to:
receive a service request from a user equipment, and determine the allocatable subband parameter in dependence on the service request.

6. The device according to claim 1, wherein the processor is further configured to:
receive a first sounding symbol, a second sounding symbol, a third further data and a fourth further data via subcarriers corresponding to allocated subbands,
wherein for a third period of time subsequent to and different from a fourth period of time the third further data is allocated to the third subband and the fourth further data to the fourth subband,
wherein for the third period of time the first sounding symbol is allocated to the third subband and the second sounding symbol is allocated to the third subband of a time-frequency resource,
determine the first sounding symbol and the second sounding symbol, and determine the third further data and the third further data.

7. A device to process a channel state information reference signal (CSI-RS) and further data to be transmitted via a first radio module of a radio communications network, in which data to be transmitted is mapped on subcarriers and in the radio module subsequently up-converted to a radio frequency higher than the subcarrier frequencies, wherein the subcarriers are grouped into frequency subbands, and wherein at least one subband is scalable with at least one subband parameter for a period of time, wherein a subband parameter is in particular a subcarrier spacing, and wherein in at least one subband at least two different parameters, in particular subcarrier spacings, can be used, wherein the device comprises:
a memory storing computer readable instructions; and
a processor configured, with the computer readable instructions, to cause the device to
determine a first CSI-RS and a second CSI-RS,
determine first further data and second further data;
allocate for a first period of time the first CSI-RS to a first subband and the second CSI-RS to a second subband of a time-frequency resource,
allocate for a second period of time subsequent to and different from the first period of time the first further data to the first subband and the second further data to the second subband, and
map the first CSI-RS, the second CSI-RS, the first further data and the second further data to subcarriers corresponding to the allocated subbands,
wherein the processor is further configured to:
align for at least the first period of time one subband parameter, in particular a subcarrier spacing, of the first subband with a corresponding subband parameter of a corresponding subband used or to be used by a second radio module.

8. The device according to claim 7, wherein the at least one subband parameter is stored on the memory as at least one preconfigured value.

9. A device to process a channel state information reference signal (CSI-RS) and further data to be transmitted via a first radio module of a radio communications network, in which data to be transmitted is mapped on subcarriers and in the radio module subsequently up-converted to a radio frequency higher than the subcarrier frequencies, wherein the subcarriers are grouped into frequency subbands, and wherein at least one subband is scalable with at least one subband parameter for a period of time, wherein a subband parameter is in particular a subcarrier spacing, and wherein in at least one subband at least two different parameters, in particular subcarrier spacings, can be used, wherein the device comprises:
a memory storing computer readable instructions; and a processor configured, with the computer readable instructions, to cause the device to
determine a first CSI-RS and a second CSI-RS,
determine first further data and second further data;
allocate for a first period of time the first CSI-RS to a first subband and the second CSI-RS to a second subband of a time-frequency resource,
allocate for a second period of time subsequent to and different from the first period of time the first further data to the first subband and the second further data to the second subband, and
map the first CSI-RS, the second CSI-RS, the first further data and the second further data to subcarriers corresponding to the allocated subbands,
wherein the at least one subband parameter is allocatable, and the least one allocatable subband parameter is received from a further device via a backhaul network.

10. A user equipment to process a channel state information reference signal CSI-RS and further data to be received via a radio communications network, in which data to be transmitted is mapped on subcarriers and subsequently up-converted to a radio frequency higher than the subcarrier frequencies, wherein the subcarriers are grouped into frequency subbands, and wherein at least one subband is scalable with at least one subband parameter for a period of time, wherein a subband parameter is in particular a subcarrier spacing, and wherein in at least one subband at least two different parameters, in particular subcarrier spacings, can be used, wherein the user equipment comprises:
a memory storing computer readable instructions; and
a processor configured to execute the computer readable instruction, which configures the processor to,
receive a first CSI-RS, a second CSI-RS, a first further data and a second further data via subcarriers corresponding to allocated subbands,
wherein for a second period of time subsequent to and different from a first period of time the first further data is allocated to the first subband and the second further data to the second subband, and
wherein for the first period of time the first CSI-RS is allocated to the first subband and the second CSI-RS is allocated to the second subband of a time-frequency resource,
determine the first CSI-RS and the second CSI-RS, and
determine the first further data and the second further data,
wherein at least some subband parameters are allocated in accordance with a first allocation scheme or a second allocation scheme,
wherein, in the first allocation scheme:
for a first period of time, a common subband parameter, in particular a same subcarrier spacing, is allocated to both the first and the second subband and
for the second period of time, a subband parameter different from the common subband parameter is allocated to at least the second subband, and wherein, in the second allocation scheme:
for the first and the second period of time, a common first subband parameter, in particular a same subcarrier spacing, is allocated to the first subband, and for the first and the second period of time, a common second subband parameter, different from the first subband parameter, is allocated to the second subband.

11. A user equipment wherein the user equipment is configured to process a sounding symbol and further data to be transmitted via a radio communications network, in which data to be transmitted is mapped on subcarriers and subsequently up-converted to a radio frequency higher than the subcarrier frequencies, wherein the subcarriers are grouped into frequency subbands, and wherein at least one subband is scalable with at least one subband parameter for a period of time, wherein a subband parameter is in particular a subcarrier spacing, and wherein in at least one subband at least two different parameters, in particular subcarrier spacings, can be used, wherein the user equipment comprises:
a memory storing computer readable instructions; and
a processor configured to execute the computer readable instructions, which configures the processor to,
determine a first sounding symbol and a second sounding symbol, determine first further data and second further data;
allocate for a first period of time the first sounding symbol to a first subband and the second sounding symbol to a second subband of a time-frequency resource,
allocate for a second period of time subsequent to and different from the first period of time the first further data to the first subband and the second further data to the second subband, and
map the first sounding symbol, the second sounding symbol, the first further data and the second further data to subcarriers corresponding to the allocated subbands,
wherein at least some subband parameters are allocated in accordance with a first allocation scheme or a second allocation scheme,
wherein, in the first allocation scheme:
for a first period of time, a common subband parameter, in particular a same subcarrier spacing, is allocated to both the first and the second subband and
for the second period of time, a subband parameter different from the common subband parameter is allocated to at least the second subband, and wherein, in the second allocation scheme:
for the first and the second period of time, a common first subband parameter, in particular a same subcarrier spacing, is allocated to the first subband, and for the first and the second period of time, a common second subband parameter, different from the first subband parameter, is allocated to the second subband.

12. A user equipment to process a channel state information reference signal CSI-RS and further data to be received via a radio communications network, in which data to be transmitted is mapped on subcarriers and subsequently up-converted to a radio frequency higher than the subcarrier frequencies, wherein the subcarriers are grouped into frequency subbands, and wherein at least one subband is scalable with at least one subband parameter for a period of time, wherein a subband parameter is in particular a subcarrier spacing, and wherein in at least one subband at least two different parameters, in particular subcarrier spacings, can be used, wherein the user equipment comprises:
a memory storing computer readable instructions; and
a processor configured to execute the computer readable instruction, which configures the processor to,
receive a first CSI-RS, a second CSI-RS, a first further data and a second further data via subcarriers corresponding to allocated subbands,
wherein for a second period of time subsequent to and different from a first period of time the first further data is allocated to the first subband and the second further data to the second subband, and wherein for the first period of time the first CSI-RS is allocated to the first subband and the second CSI-RS is allocated to the second subband of a time-frequency resource, determine the first CSI-RS and the second CSI-RS, and determine the first further data and the second further data, wherein, for at least the first period of time, one subband parameter, in particular a subcarrier spacing, of the first subband is aligned with a corresponding subband parameter of a corresponding subband used or to be used by a second radio module.

13. A user equipment to process a channel state information reference signal CSI-RS and further data to be received via a radio communications network, in which data to be transmitted is mapped on subcarriers and subsequently up-converted to a radio frequency higher than the subcarrier frequencies, wherein the subcarriers are grouped into frequency subbands, and wherein at least one subband is scalable with at least one subband parameter for a period of time, wherein a subband parameter is in particular a subcarrier spacing, and wherein in at least one subband at least two different parameters, in particular subcarrier spacings, can be used, wherein the user equipment comprises:

a memory storing computer readable instructions; and a processor configured to execute the computer readable instruction, which configures the processor to, receive a first CSI-RS, a second CSI-RS, a first further data and a second further data via subcarriers corresponding to allocated subbands, wherein for a second period of time subsequent to and different from a first period of time the first further data is allocated to the first subband and the second further data to the second subband, and wherein for the first period of time the first CSI-RS is allocated to the first subband and the second CSI-RS is allocated to the second subband of a time-frequency resource, determine the first CSI-RS and the second CSI-RS, and determine the first further data and the second further data, wherein the at least one subband parameter is allocatable, and the least one allocatable subband parameter is received from a further device via a backhaul network.

* * * * *